June 24, 1930.  W. BROWN  1,767,046
DEVICE FOR OPERATING REAR CURTAINS OF AUTOMOBILES
Filed Oct. 29, 1928
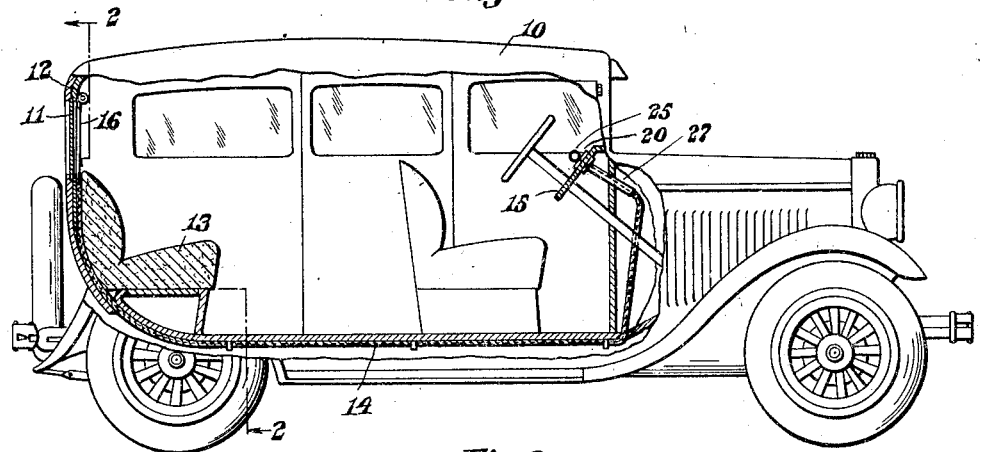
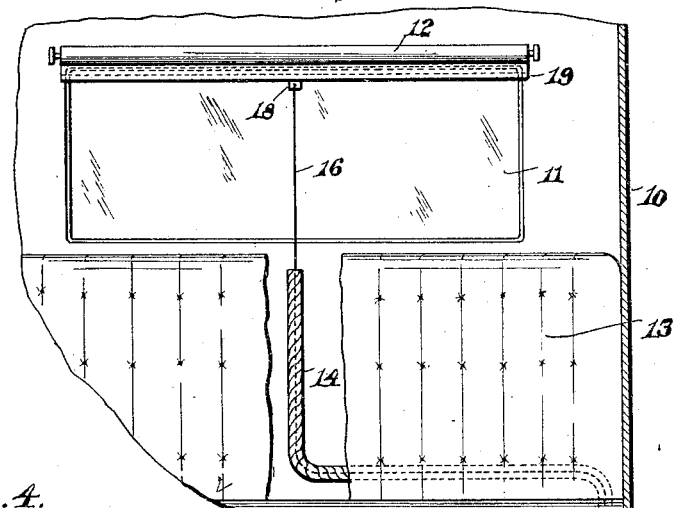
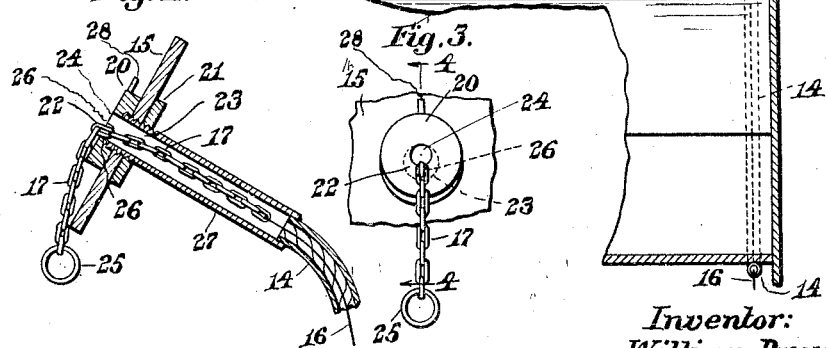
Inventor:
William Brown,
by Walter E. Lombard,
Atty.

Patented June 24, 1930

1,767,046

UNITED STATES PATENT OFFICE

WILLIAM BROWN, OF REVERE, MASSACHUSETTS

DEVICE FOR OPERATING REAR CURTAINS OF AUTOMOBILES

Application filed October 29, 1928. Serial No. 315,673.

This invention relates to means for operating the rear curtains of sedans and other automobiles and has for its object the provision of means whereby such curtains may be operated quickly by the driver of the car.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents an elevation, partially in section, of an automobile having applied thereto a rear curtain operating mechanism embodying the principles of the present invention.

Figure 2 represents a section of a portion of the same on line 2, 2, on Fig. 1.

Figure 3 represents an elevation of the pulling member and lock therefor, and

Figure 4 represents a section of same on line 4, 4, on Fig. 3.

Similar characters indicate like parts throughout the several figures of the drawing.

In the drawings, 10 is a motor car provided with a rear window 11.

This window 11 is provided with a spring actuated curtain 12 of usual construction, the spring thereof tending to raise the curtain when released and uncover the window.

When at night other cars are in the rear of a motor car the glaring headlights thereof throw beams of light upon the mirror and windshield of the car in advance and seriously interfere with the operation of said car.

When someone is on the rear seat 13 of the car the curtain 12 may be drawn down by such persons but even then the operation is not quick enough to avoid trouble.

It often happens, however, that the rear of the car is unoccupied and in this case the curtain can not be drawn as it is out of reach of the operator of the car.

It is, therefore, desirable to provide some means whereby the operator may quickly draw the curtain 12 to cover the window 11 and then release it again when there is no longer occasion for keeping the window covered.

To this end a flexible tube 14 is provided extending from the rear of the car to the instrument board 15 with the rear end of said tube 14 extending upwardly behind the rear seat 13.

The tube 14 may extend along the car body in any well known manner.

Within the tube 14 is a flexible member such as the wire 16, the forward end of which is connected to the rear end of a short chain 17 while the rear end thereof is connected at 18 to a bar or rod 19 at the bottom of the curtain.

In the instrument board 15 is disposed an annular member 20 which is retained in position by a clamping nut 21.

This member 20 is provided at its rear end with a flange 22 partially closing the opening 23 in said member and leaving an opening 24 of sufficient size to permit the free passage of the chain 17 which is provided with a ring 25 or similar member of greater diameter than the opening 24, thus preventing said ring 25 passing through said opening and leaving it at all times in position where it may be quickly grasped by the car operator and pulled to lower the curtain 12.

The flange 22 has a slot 26 therein adapted to receive a link of the chain 17 and lock it in adjusted position.

By means of this locking means the curtain may be retained in its lowered position for any desired length of time but as soon as said chain 17 is released from the slot 26 the spring in the curtain rod will raise the curtain.

By providing the locking device the curtain 12 may be partially drawn when desired and retained in this adjusted position.

Only a short length of chain 17 is used, the length of which slightly exceeds the length of the curtain 12.

This chain 17 extends through a short straight tube 27 threaded to and extending forwardly from the member 20 beneath the hood of the car.

The front end of the tube 14 is soldered or otherwise secured to the forward end of the tube 27.

Extending upwardly from the annular member 20 is a pin 28 on which the ring 25 of the pulling chain 17 may be hung when the curtain 12 is down and the window 11 covered.

By this means the chain 17 may be held up out of the way of the operator's legs.

When a car is equipped with this curtain-actuating means, the curtain 12 may be drawn instantly by the operator thereof as soon as he becomes annoyed by the reflections of headlights in the rear of the car.

By making it possible for the operator to quickly operate the rear curtain many serious accidents may be avoided.

It is believed that the operation and many advantages of the invention will be understood without further description.

Having thus described my invention, I claim:

1. In a device for actuating the rear curtain of an automobile, a pulling member therefor including a short length of chain, a tubular member secured to the dash board and through which said chain extends; a ring on the end of said chain; and a member on the inner end of said tubular member provided with a notch adapted to receive a link of said chain and prevent end movement of said chain.

2. In a device for actuating the rear curtain of an automobile, a pulling member therefor including a short length of chain, a tubular member extending through the dash board and through which said chain extends, said member having its inner end threaded; a ring on the end of said chain; and a nut threaded to the inner end of said tubular member provided with a notch adapted to receive a link of said chain and prevent end movement of said chain.

3. In a device for actuating the rear curtain of an automobile, a pulling member therefor including a short length of chain, a tubular member secured to the dash board and through which said chain extends; a ring on the end of said chain; and a member on the inner end of said tubular member provided with a notch adapted to receive a link of said chain and prevent end movement of said chain and having a pin extending upwardly therefrom to form a support for said ring.

4. In a device for actuating the rear curtain of an automobile, a pulling member therefor including a short length of chain, a tubular member extending through the dash board and through which said chain extends; a ring on the end of said chain; a member on the inner end of said tubular member contacting with one face of the dash board and provided with a notch adapted to receive a link of said chain and prevent end movement of said chain; and a clamp nut threaded to said tubular member on the opposite side of said dash board.

5. In a device for actuating the rear curtain of an automobile, a pulling member therefor including a short length of chain, a tubular member secured to the dash board and through which said chain extends; a ring on the end of said chain; and a member on the inner end of said tubular member provided with means for normally locking said chain from end movement.

Signed by me at 746 Old South Bldg., Boston, Massachusetts, this 23rd day of October, 1928.

WILLIAM BROWN.